United States Patent

Graziosi

(10) Patent No.: US 11,196,977 B2
(45) Date of Patent: Dec. 7, 2021

(54) UNIFIED CODING OF 3D OBJECTS AND SCENES

(71) Applicant: SONY CORPORATION, Tokyo (JP)

(72) Inventor: Danillo Graziosi, San Jose, CA (US)

(73) Assignee: Sony Group Corporation, Tokyo (JP)

( * ) Notice: Subject to any disclaimer, the term of this patent is extended or adjusted under 35 U.S.C. 154(b) by 40 days.

(21) Appl. No.: 16/798,165

(22) Filed: Feb. 21, 2020

(65) Prior Publication Data
US 2021/0092345 A1 Mar. 25, 2021

Related U.S. Application Data

(60) Provisional application No. 62/904,867, filed on Sep. 24, 2019, provisional application No. 62/910,999, filed on Oct. 4, 2019.

(51) Int. Cl.
*H04N 13/161* (2018.01)
*H04N 19/136* (2014.01)

(52) U.S. Cl.
CPC ......... *H04N 13/161* (2018.05); *H04N 19/136* (2014.11)

(58) Field of Classification Search
CPC .......................... H04N 13/161; H04N 19/597
See application file for complete search history.

(56) References Cited

U.S. PATENT DOCUMENTS

| | | | |
|---|---|---|---|
| 10,306,254 B2 | 5/2019 | Matei et al. | |
| 10,432,969 B2 | 10/2019 | Tech et al. | |
| 2020/0045290 A1* | 2/2020 | Ruhm | H04N 13/161 |
| 2020/0364904 A1* | 11/2020 | Najaf-Zadeh | G06T 9/00 |
| 2021/0258610 A1* | 8/2021 | Iguchi | G06T 9/00 |

OTHER PUBLICATIONS

Sebastian Schwarz et al., "2D Video Coding of Volumetric Video Data", Nokia Technologies, Tampere, Finland, Tempere University of Technology, Tampere, Finland, IEEE, 2018, pp. 61-65.

* cited by examiner

*Primary Examiner* — Rebecca A Volentine
(74) *Attorney, Agent, or Firm* — Haverstock & Owens LLP

(57) ABSTRACT

Methods for unified coding of 3D objects and 3D scenes are described herein. A flexible camera model is used to capture either parts of a 3D object or multiple views of a 3D scene. The flexible camera model is transmitted as metadata, and the captured 3D elements (objects and scenes) are combined in a 2D atlas image that is able to be further compressed with 2D video encoders. Described herein is a unification of two implementations for 3D coding: V-PCC and MIV. Projections of the scene/object of interest are used to map the 3D information into 2D, and then subsequently use video encoders. A general camera concept is able to represent both models via signaling to allow coding of both 3D objects and 3D scenes. With the flexible signaling of the camera model, the encoder is able to compress several different types of content into a single bitstream.

15 Claims, 18 Drawing Sheets

UNIFIED CODING OF 3D OBJECTS AND SCENES

CROSS-REFERENCE TO RELATED APPLICATION(S)

This application claims priority under 35 U.S.C. § 119(e) of the U.S. Provisional Patent Application Ser. No. 62/904,867, filed Sep. 24, 2019 and titled, "UNIFIED CODING OF 3D OBJECTS AND SCENES" and U.S. Provisional Patent Application Ser. No. 62/910,999, filed Oct. 4, 2019 and titled, "UNIFIED CODING OF 3D OBJECTS AND SCENES" which are hereby incorporated by reference in their entireties for all purposes.

FIELD OF THE INVENTION

The present invention relates to three dimensional graphics. More specifically, the present invention relates to coding of three dimensional graphics.

BACKGROUND OF THE INVENTION

3D Representations 3D coding using 2D projections is able to be divided into two categories depending on the chosen camera arrangement/model. Inward-facing cameras usually focus on the capture of 3D objects, while outward-facing cameras capture 3D scenes. According to each category, object-centric or scene-centric capture, different camera models are able to be used. V-PCC is an example of object-centric coding, where the camera models are orthographic cameras only. For the scene-centric coding case, MIV is an alternative 3D coding method that uses different camera types, such as perspective, omnidirectional or Cube Map camera arrangements.

V-PCC and MIV

In 3D point cloud coding using video encoders (e.g., V-PCC), projection from 3D to 2D is used to generate the videos that will represent the point cloud. The most efficient way of generating those videos is using 3D patches, which segments the surface of the object and uses orthogonal projection to generate segmented depth, occupancy map and texture images. The images of the 3D patches are bundled together in a 2D atlas and used as input of video encoders. This is equivalent to having virtual cameras pointing inward and capturing a single object, that is, an object-centric capture approach, and composing a mosaic of different camera views and coding the mosaic image. However, the procedure is optimized for 3D object representation, and elements of a surrounding scene (like a 360 degree view of the environment) are usually not coded with this method.

In 3D scene coding using texture and corresponding depth maps (e.g., MIV), a scene is captured by several cameras, usually situated at a particular position and facing outward. The scene-centric capture approach uses the view of real cameras with their corresponding depth maps to represent the 3D scene. Some camera views are coded as is, while other camera views encode only parts of the scene, depending on the overlap with other previously coded cameras. The partial views are considered patches, which are arranged together in one or more atlas images. Some full reference views along with other atlas views are then coded by video encoders. Even though large scenes can be efficiently encoded with this method, navigation is usually limited to the camera positions, and depth representation may be represented in a non-uniform manner (for example, reversed depth may be used, where the position of objects closer to the cameras have more precision). Such a coding method may not be appropriate for 3D objects.

In MPEG 127 Meeting in Gothenburg, Sweden, contribution m49590 ("Video-based Point Cloud Coding High Level Syntax: Updates and Unification with the Working Draft on Metadata for Immersive Video) proposes some additional syntax elements to unify MIV and V-PCC encoders. Nevertheless, the camera models are still defined separately and many issues, such as inverse depth representation, are not addressed by the proposal. Furthermore, the proposal fails to identify the common elements between the two approaches, and does not take advantage of the commonalities in camera modeling.

Separate Coding of Related 3D Elements

Each coding method (V-PCC and MIV) proposes an independent way to signal their typical camera model, but the syntax elements used by each separate codec cannot represent the camera model of the other one, meaning V-PCC cameras cannot be represented using MIV signaling and vice-versa. Therefore, 3D objects and 3D scenes still need to be encoded separately.

SUMMARY OF THE INVENTION

Methods for unified coding of 3D objects and 3D scenes are described herein. A flexible camera model is used to capture either parts of a 3D object (represented as 3D patches) or multiple views of a 3D scene. The flexible camera model is transmitted as metadata, and the captured 3D elements (objects and scenes) are combined in a 2D atlas image that is able to be further compressed with conventional 2D video encoders. Described herein is a unification of two implementations for 3D coding: V-PCC (for point clouds, which assumes an inward-looking camera) and MIV (for multi-view camera plus depth, which assumes an outward-looking camera).

In both cases, projections of the scene/object of interest are used to map the 3D information into 2D, and then subsequently use video encoders. Nevertheless, camera models and depth representation are able to be slightly different for each method. A general camera concept is able to represent both models via signaling to allow coding of both 3D objects and 3D scenes. With the flexible signaling of the camera model, the encoder is able to compress several different types of content into a single bitstream.

In one aspect, a method programmed in a non-transitory memory of a device comprises determining whether content comprises video point cloud type or multi-view type, encoding the content determined to be the video point cloud type into a bitstream using video point cloud coding and encoding the content determined to be the multi-view type into the bitstream using multi-view coding. The method further comprises indicating if an occupancy map is embedded in a geometry stream. The method further comprises indicating if a range of a depth image was compressed. The method further comprises converting an atlas of the content to a display. Converting the atlas of the content to the display utilizes a plurality of matrices. The plurality of matrices include: an atlas to patch matrix, a patch to screen matrix, a screen to normalized device coordinate matrix, a normalized device coordinate to camera matrix and a camera to world matrix. Converting the atlas of the content to a display includes selecting a patch from the atlas.

In another aspect, an apparatus comprises a non-transitory memory for storing an application, the application for: determining whether content comprises video point cloud type or multi-view type, encoding the content determined to be the video point cloud type into a bitstream using video point cloud coding and encoding the content determined to be the multi-view type into the bitstream using multi-view coding and a processor coupled to the memory, the processor configured for processing the application. The application is further configured for indicating if an occupancy map is embedded in a geometry stream. The application is further configured for indicating if a range of a depth image was compressed. The application is further configured for converting an atlas of the content to a display. Converting the atlas of the content to the display utilizes a plurality of matrices. The plurality of matrices include: an atlas to patch matrix, a patch to screen matrix, a screen to normalized device coordinate matrix, a normalized device coordinate to camera matrix and a camera to world matrix. Converting the atlas of the content to a display includes selecting a patch from the atlas.

In another aspect, a system comprises one or more cameras for acquiring three dimensional content and an encoder for encoding the three dimensional content by: determining whether content comprises video point cloud type or multi-view type, encoding the content determined to be the video point cloud type into a bitstream using video point cloud coding and encoding the content determined to be the multi-view type into the bitstream using multi-view coding. The encoder is further configured for indicating if an occupancy map is embedded in a geometry stream. The encoder is further configured for indicating if a range of a depth image was compressed. The encoder is further configured for converting an atlas of the content to a display. Converting the atlas of the content to the display utilizes a plurality of matrices. The plurality of matrices include: an atlas to patch matrix, a patch to screen matrix, a screen to normalized device coordinate matrix, a normalized device coordinate to camera matrix and a camera to world matrix. Converting the atlas of the content to a display includes selecting a patch from the atlas.

DETAILED DESCRIPTION OF THE PREFERRED EMBODIMENT

Figure 1:
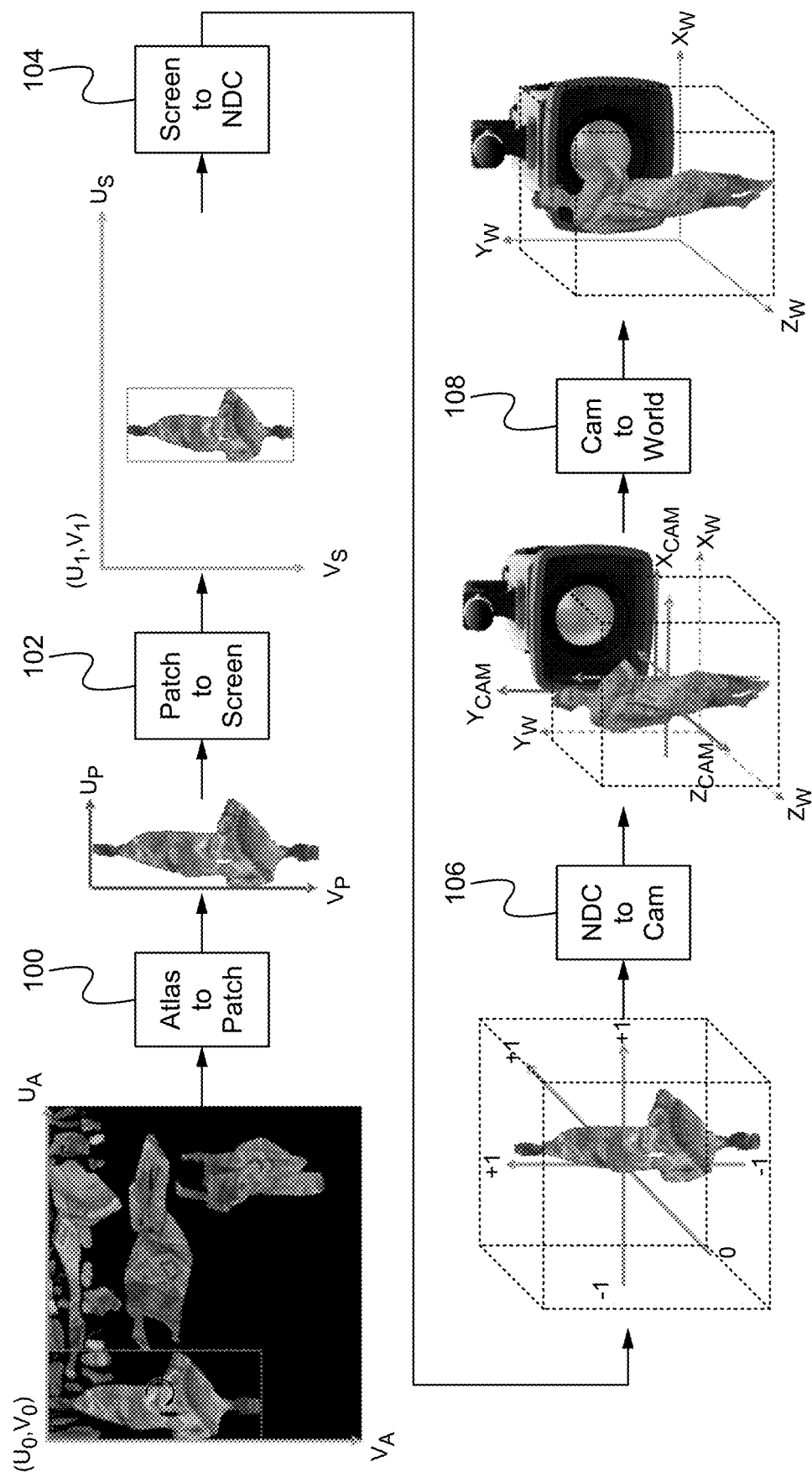
FIG. 1 illustrates a diagram of a method of going from an atlas to the real world using point cloud coordinates according to some embodiments.

Unified coding of 3D objects and 3D scenes is described herein. A flexible camera model is used to capture either parts of a 3D object or multiple views of a 3D scene. The flexible camera model is transmitted as metadata, and the captured 3D elements (objects and scenes) are combined in a 2D atlas image that is able to be further compressed with 2D video encoders. A unification of two implementations for 3D coding: V-PCC and MIV is described herein. Projections of the scene/object of interest are used to map the 3D information into 2D and then subsequently use video encoders. A general camera concept is able to represent both models via signaling to allow coding of both 3D objects and 3D scenes. With the flexible signaling of the camera model, the encoder is able to compress several different types of content into a single bitstream.

A unified 3D coding scheme syntax is shown:

| | Descriptor |
|---|---|
| vpcc_parameter_set( ) { | |
|   profile_tier_level( ) | |
|   camera_parameters( ) | |
|   vpcc_sequence_parameters_set_id | u(4) |
|   vpcc_atlas_count_minus1 | u(6) |
|   for (j = 0; j< vpcc_atlas_count_minus1 + 1; j++) { | |
|     vpcc_frame_width[j] | u(16) |
|     vpcc_frame_height[j] | u(16) |
|     vpcc_avg_frame_rate_present_flag[j] | u(1) |
|     if (vpcc_avg_frame_rate_present_flag[j]) | |
|       vpcc_avg_frame_rate[j] | u(16) |
|     vpcc_map_count_minus1[j] | u(4) |
|     if (vpcc_map_count_minus1[j] > 0) | |
|       vpcc_multiple_map_streams_present_flag[j] | u(1) |
|     vpcc_map_absolute_coding_enabled_flag[j] | |
|     for (i = 0; i<vpcc_map_count_minus1[j]; i++) { | |
|       vpcc_map_absolute_coding_enabled_flag[j][i+1] | u(1) |
|       if (vpcc_map_absolute_coding_enabled_flag[j][i+1] == 0 { | |
|         if (i>0) | |
|           vpcc_map_predictor_index_diff[j][i+1] | ue(v) |
|         else | |
|           vpcc_map_predictor_index_diff[j][i+1]=0 | |
|       } | |
|     } | |
|     vpcc_raw_patch_enabled_flag[j] | u(1) |
|     if(vpcc_raw_patch_enabled_flag[j]) | |
|       vpcc_raw_separate_video_present_flag[j] | u(1) |
|     occupancy_information(j) | |
|     geometry_information(j) | |
|     attribute_information(j) | |
|   } | |
|   byte_alignment( ) | |
| } | |

| | Descriptor |
|---|---|
| occupancy_information (atlas_id) { | |
|     oi_occupancy_map_embedded_flag[atlas_id] | u(1) |
|     if(oi_occupancy_map_embedded_flag[atlas_id]) { | |
|         oi_occupancy_map_embedded_threshold[atlas_id] | u(8) |
|     } else { | |
|         oi_occupancy_codec_id[atlas_id] | u(8) |
|         oi_lossy_occupancy_map_compression_threshold[atlas_id] | u(8) |
|         oi_occupancy_nominal_2d_bitdepth_minus1[atlas_id] | u(5) |
|         oi_occupancy_MSB_align_flag[atlas_id] | u(1) |
|     } | |
| } | |

| | Descriptor |
|---|---|
| geometry_information(atlast_id) { | |
|     gi_geometry_codec_id[atlas_id] | u(8) |
|     gi_geometry_nominal_2d_bitdepth_minus1[atlas_id] | u(5) |
|     gi_geometry_MSB_align_flag[atlas_id] | u(1) |
|     gi_geometry_3d_coordinates_bitdepth_minus1[atlas_id] | u(5) |
|     if(vpcc_raw_separate_video_present_flag[atlas_id]) | |
|         gi_raw_geometry_codec_id[atlas_id] | u(8) |
|     gi_geometry_range_compression_flag[atlas_id] | u(1) |
|     if(gi_geometry_range_compression_flag[atlas_id]) | |
|         gi_range_conversion_offset[atlas_id] | u(8) |
| } | |

| | Descriptor |
|---|---|
| camera_params_list( ){ | |
|     cpl_explicit_projection_info_enabled_flag | u(1) |
|     if (cpl_explicit_projection_info_enabled_flag) { | |
|         cpl_num_cameras_minus1 | u(16) |
|         cpl_cam_pos_x_granularity | u(32) |
|         cpl_cam_pos_y_granularity | u(32) |
|         cpl_cam_pos_z_granularity | u(32) |
|         cpl_yaw_pitch_roll_present_flag | u(1) |
|         cpl_cam_id_present_flag | u(1) |
|         for (i=0; i<=cpl_num_cameras_minus1; i++) { | |
|             if (cam_id_present flag) | |
|                 cpl_cam_view_id[i] | u(16) |
|             else | |
|                 cpl_cam_view_id[i] = i | |
|             cpl_cam_pos_x[i] | u(32) |
|             cpl_cam_pos_y[i] | u(32) |
|             cpl_cam_pos_z[i] | u(32) |
|             if (cpl_yaw_pitch_roll_present flag) { | |
|                 cpl_cam_yaw[i] | u(32) |
|                 cpl_cam_pitch[i] | u(32) |
|                 cpl_cam_roll[i] | u(32) |
|                 cpl_cam_scaling_flag[i] | u(1) |
|                 if (cpl_cam_scaling_flag) { | |
|                     cpl_cam_rot_scale_x[i] | u(32) |
|                     cpl_cam_rot_scale_y[i] | u(32) |
|                     cpl_cam_rot_scale_z[i] | u(32) |
|                 } | |
|             } | |
|         } | |
|         cpl_intrinsic_params_equal_flag | u(1) |
|         camera_intrinsics(cpl_intrinsic_params_equal, cpl_num_cameras_minus_1) | |
|         cpl_depth_quantization_params_equal_flag | u(1) |
|         depth_quantization(cpl_depth_quantization_equal_flag, cpl_num_cameras_minus_1) | |
|     } | |
|     else { | |
|         cpl_45degree_projection_patch_enabled_flag | u(1) |
|         cpl_num_cameras_minus1 = cpl_45degree_projection_patch_enabled_flag? 6 : 10 | |
|     } | |
| } | |

| | Descriptor |
|---|---|
| camera_intrinsics(equalFlag, numCamerasMinus1) { | |
|     for (v=0; v<=; v++) { | |
|         if (v == 0 || equalFlag == 0) { | |
|             cam_type[v] | u(8) |
|             projection_plane_width[v] | u(32) |
|             projection_plane_height[v] | u(32) |
|             cpl_cam_reverse depth flag[i] | u(1) |
|             cpl_cam_projection_mode flag[i] | u(1) |
|             if (cam_type[v] == 0) { | |
|                 erp_phi_min[v] | u(32) |
|                 erp_phi_max[v] | u(32) |
|                 erp_theta_min[v] | u(32) |
|                 erp_theta_max[v] | u(32) |
|             } else if (cam_type[v] == 1) | |
|                 cubic_map_type[v] | u(8) |
|             else if (cam_type[v] == 2) { | |
|                 perspective_focal_hor[v] | u(32) |
|                 perspective_focal_ver[v] | u(32) |
|                 perspective_center_hor[v] | u(32) |
|                 perspective_center_ver[v] | u(32) |
|             } | |
|             else { | |
|                 cam_type[v] = cam_type[0] | |
|                 projection_plane_width[v] = projection_plane_width[0] | |
|                 projection_plane_height[v] = projection_plane_height[0] | |
|                 erp_phi_min[v] = erp_phi_min[0] | |
|                 erp_phi_max[v] = erp_phi_max[0] | |
|                 erp_theta_min[v] = erp_theta_min[0] | |
|                 erp_theta_max[v] = erp_theta_max[0] | |
|                 cubic_map_type[v] = cubic map type[0] | |
|                 perspective_focal_hor[v] = perspective_focal_hor[0] | |
|                 perspective_focal_ver[v] = perspective_focal_ver[0] | |
|                 perspective_center_hor[v] = perspective_center_hor[0] | |
|                 perspective_center_ver[v] = perspective_center_ver[v] | |
|             } | |
|         } | |
|     } | |
| } | |

| | Descriptor |
|---|---|
| depth_quantization(equalFlag, numCameraMinus1) { | |
|     for (v=0; v<=; v++) { | |
|         if (v==0 || equalFlag == 0) { | |
|             quantization_law[v] | u(8) |
|             if (quantization law[v] == 0) { | |
|                 depth_near[v] | u(32) |
|                 depth_far[v] | u(32) |
|             } | |
|         } else { | |
|             quantization_law[v] = quantization_law[0] | |
|             depth_near[v] = depth_near[0] | |
|             depth_far[v] = depth_far[v] | |
|         } | |
|     } | |
| } | |

In MIV, the occupancy map is not sent. The occupancy map is embedded in the geometry video (stream). A flag (oi_occupancy_map_embedded_flag[atlas_id] is able to be included in bitstream to indicate whether the occupancy map is being sent separately from the geometry video. If the occupancy map is not sent separately, then it is extracted from the geometry video. A threshold is used for extraction:

```
if (GVD[0][x][y] < oi_occupancy_map_embedded_threshold[atlas_id])
    OVD[0][x][y] = 0
else
    OVD[0][x][y] = 1
```

If a value is above the threshold, then the position is occupied; otherwise, it is not occupied.

For depth range conversion, when gi_geometry_nominal_2d_bitdepth_minus1[j]+1>gi_geometry_decoded_2d_bitdepth:

offsetMax=gi_range_offset[j]

maxFrom=(1<<gi_geometry_decoded_2d_bitdepth[j])−1−offsetMax)

maxTo=(1<<(gi_geometry_decoded_2d_bitdepth_minus1[j]+1))−1)

valueTo=(((valueFrom−offsetMax*maxTo+maxFrom/2U)/maxFrom)

if (oi_occupancy_map_embedded_flag[atlas_id]==1)
valueTo>0 ? valueTo: 1;
Otherwise (gi_geometry_nominal_2d_bitdepth_minus1[j]+1<=gi_geometry_decoded_2d_bitdepth), the following applies:
when gi_geometry_MSB_align_flag[j] is equal to 1:

$S_n = (S_d + (1 << (bitDiff-1))) >> bitDiff$ otherwise (gi_geometry_MSB_align_flag[j] is equal to 0):

$S_n = \min(S_d, (1 << (gi\_geometry\_nominal\_2d\_bitdepth\_minus1[j]+1))-1))$

Other mapping methods are possible.

FIG. 1 illustrates a diagram of a method of going from an atlas to the real world using point cloud coordinates according to some embodiments. There are roughly 5 steps to go to reprojection from the atlas, where the atlas is a 2D representation of a 3D object. In the step 100, a patch is extracted from the atlas. Patch extraction is able to be performed in any manner. In the step 102, the patch is then converted to a screen. In the step 104, the screen is converted to a Normalized Device Coordinate (NDC) system. In the step 106, the NDC system is converted to the camera coordinate system. In the step 108, the camera coordinate system is converted to the real world, where the object is presented.

Figure 2:
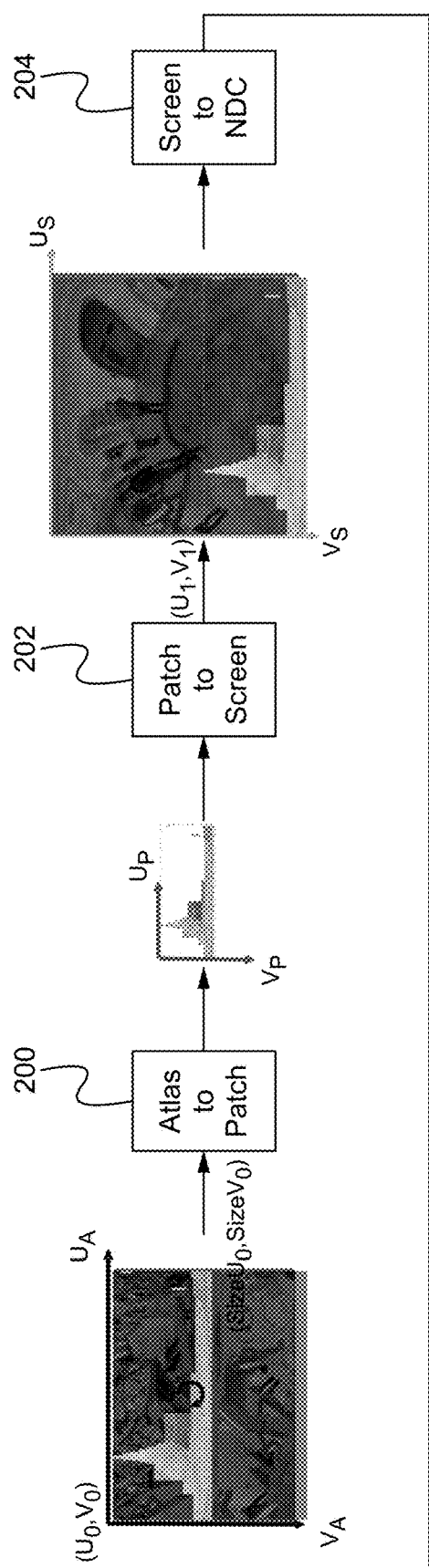
FIG. 2 illustrates a diagram of a method of going from an atlas to the real world using MultI-View (MIV) coordinates according to some embodiments.
Figure 2:
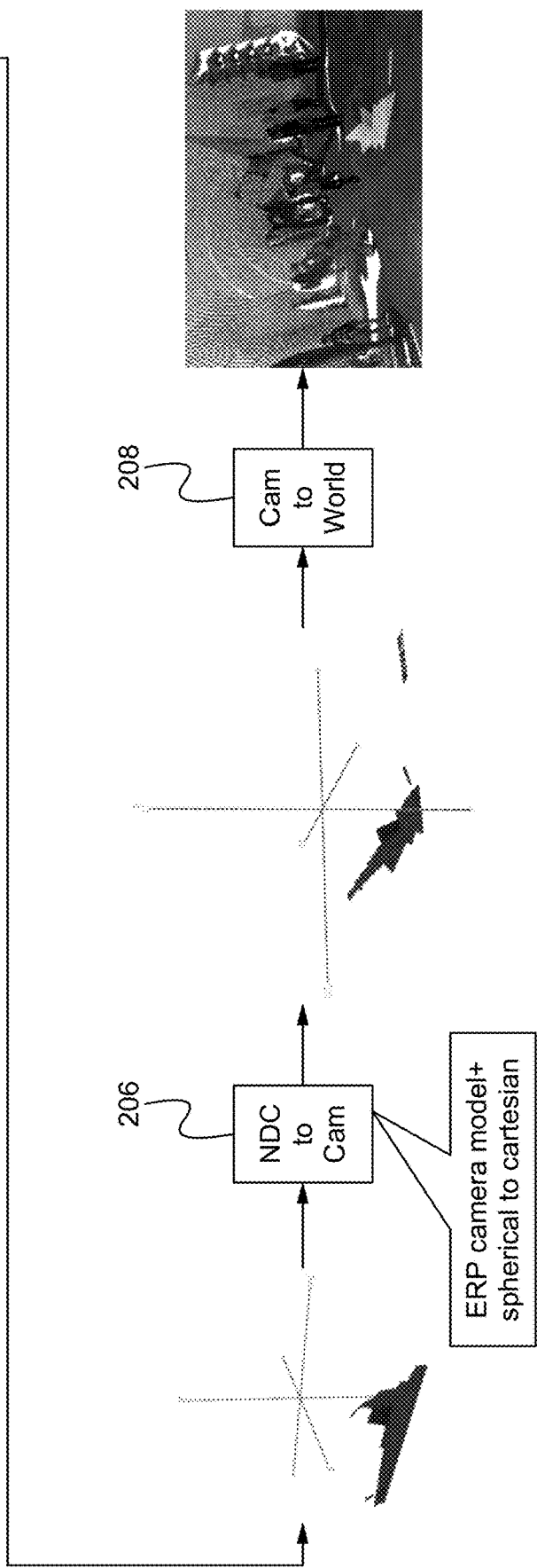

FIG. 2 illustrates a diagram of a method of going from an atlas to the real world using MultI-View (MIV) coordinates according to some embodiments. There are roughly 5 steps to go to reprojection from the atlas, where the atlas is a 2D representation of a 3D scene. In the step 200, a patch is extracted from the atlas. In the step 202, the patch is then converted to a screen. In the step 204, the screen is converted to a Normalized Device Coordinate (NDC) system. In the step 206, the NDC system is converted to the camera coordinate system. The camera model is a perspective camera, not an orthographic camera (which is used for V-PCC coding). In the step 208, the camera coordinate system is converted to the real world, where the object is presented.

Figure 3:
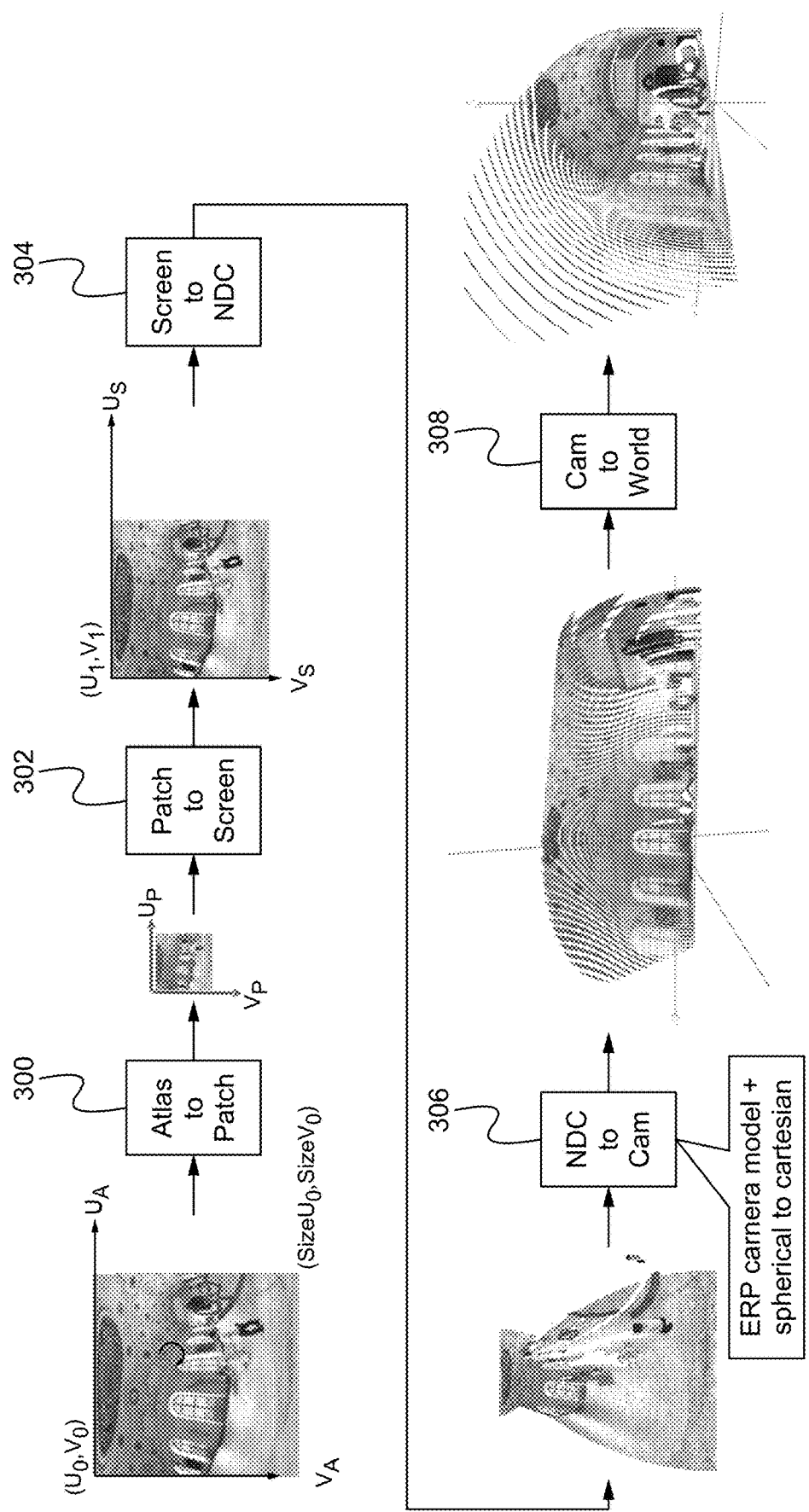
FIG. 3 illustrates a diagram of a method of going from an atlas to the real world using MultI-View (MIV) coordinates and the entire view according to some embodiments.

FIG. 3 illustrates a diagram of a method of going from an atlas to the real world using MultI-View (MIV) coordinates and the entire view according to some embodiments. There are roughly 5 steps to go to reprojection from the atlas, where the atlas is a 2D representation of a 3D scene. In the step 300, a patch is extracted from the atlas. In this example, the patch is the entire scene. In the step 302, the patch is then converted to a screen. In the step 304, the screen is converted to a Normalized Device Coordinate (NDC) system. In the step 306, the NDC system is converted to the camera coordinate system. The camera model is a perspective camera, not an orthographic camera (which is used for V-PCC coding). In the step 308, the camera coordinate system is converted to the real world, where the object is presented.

As is described herein, the conversions in each step are able to be performed in any manner such as using specific matrices for conversion from one space/coordinate system to another.

Figure 4:
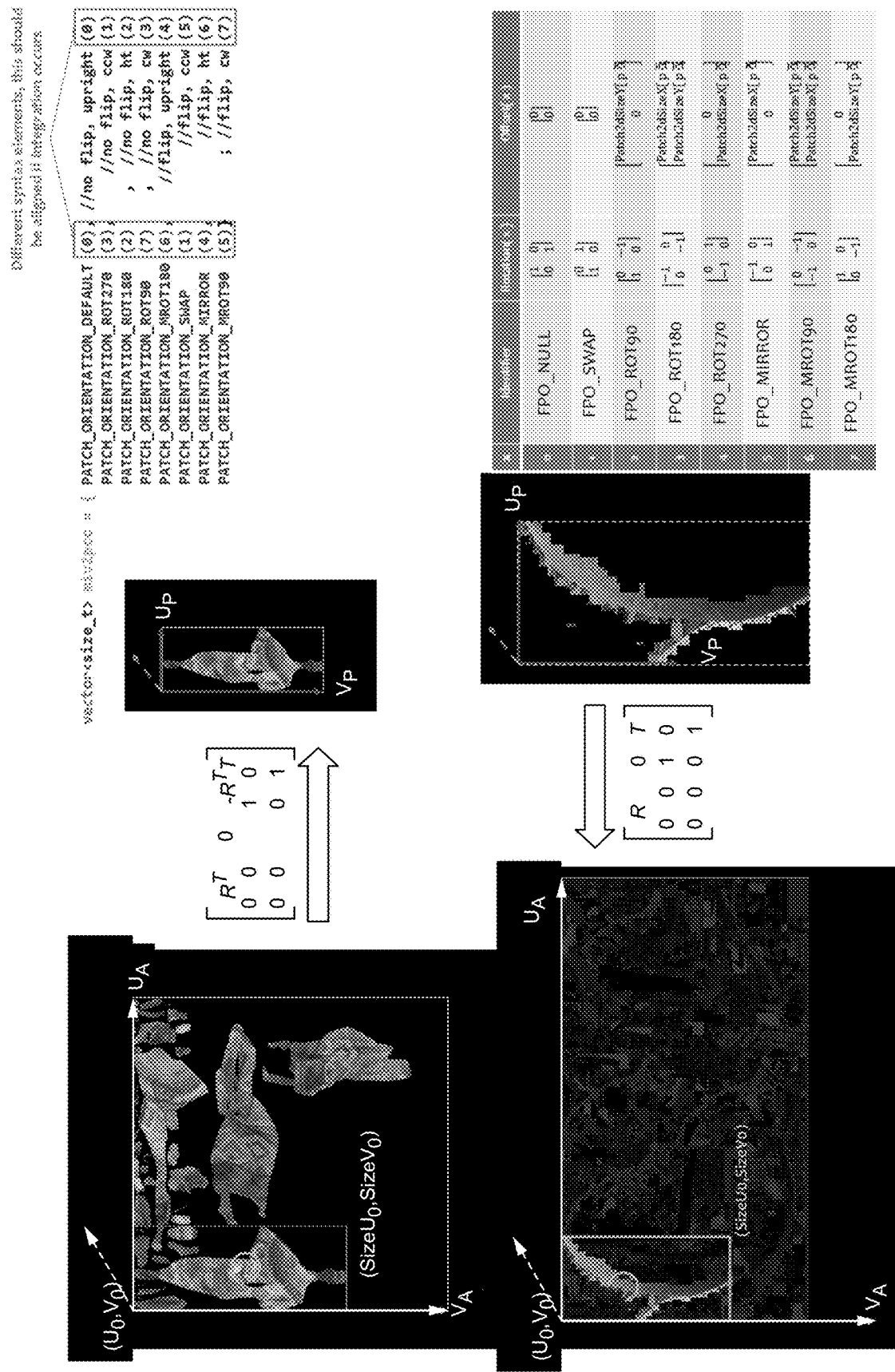
FIG. 4 illustrates a diagram of atlas to patch conversion according to some embodiments.

FIG. 4 illustrates a diagram of atlas to patch conversion according to some embodiments. The atlas to patch conversion utilizes a matrix. In some embodiments, a homography transform is implemented. For example, the homography transform as described in U.S. patent application Ser. No. 16/525,175, filed Jul. 29, 2019 and titled "POINT CLOUD CODING USING HOMOGRAPHY TRANSFORM," which is incorporated by reference in its entirety for all purposes, is utilized. Depending on the orientation of the patch, different matrices are utilized (e.g., rotation and offset).

Figure 5:
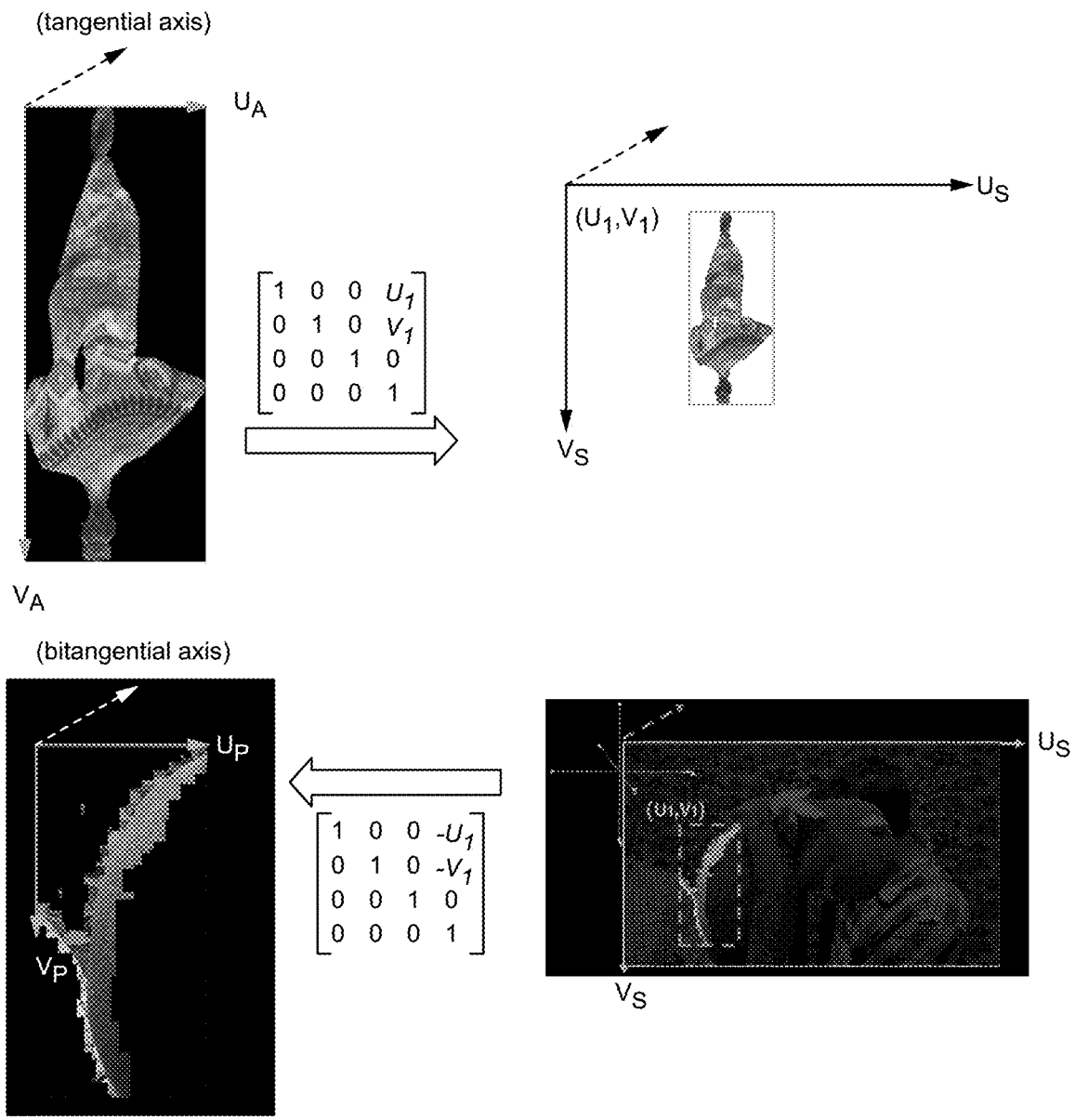
FIG. 5 illustrates a diagram of patch to screen conversion according to some embodiments.

FIG. 5 illustrates a diagram of patch to screen conversion according to some embodiments. One or more matrices are utilized to convert from the patch to the screen.

Figure 6:
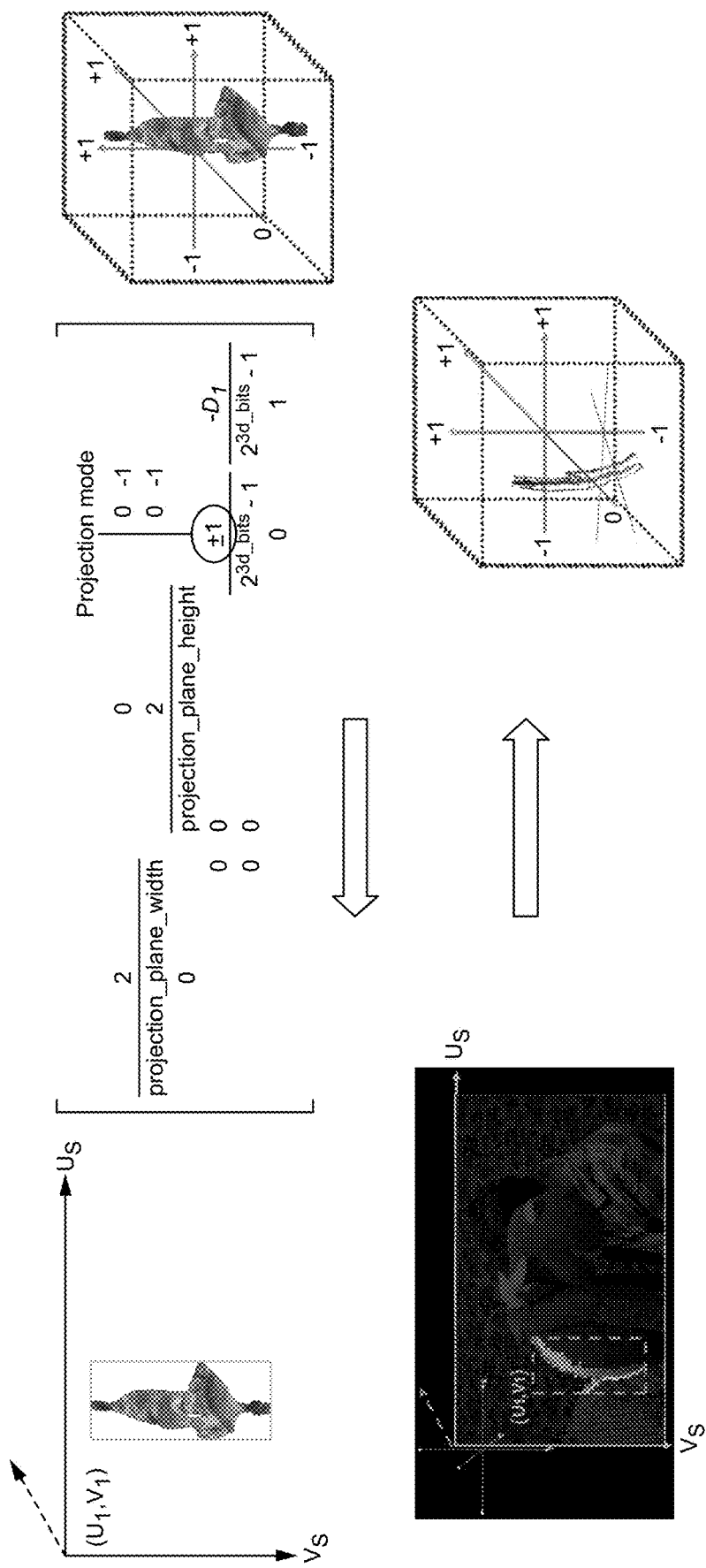
FIG. 6 illustrates a diagram of screen to NDC system conversion according to some embodiments.

FIG. 6 illustrates a diagram of screen to NDC system conversion according to some embodiments. Projection plane width, projection plane height, bit depth and projection mode are all able to be used with a matrix for the conversion. Compression artifacts are able to affect the z coordinate, so clipping is performed.

Figure 7:
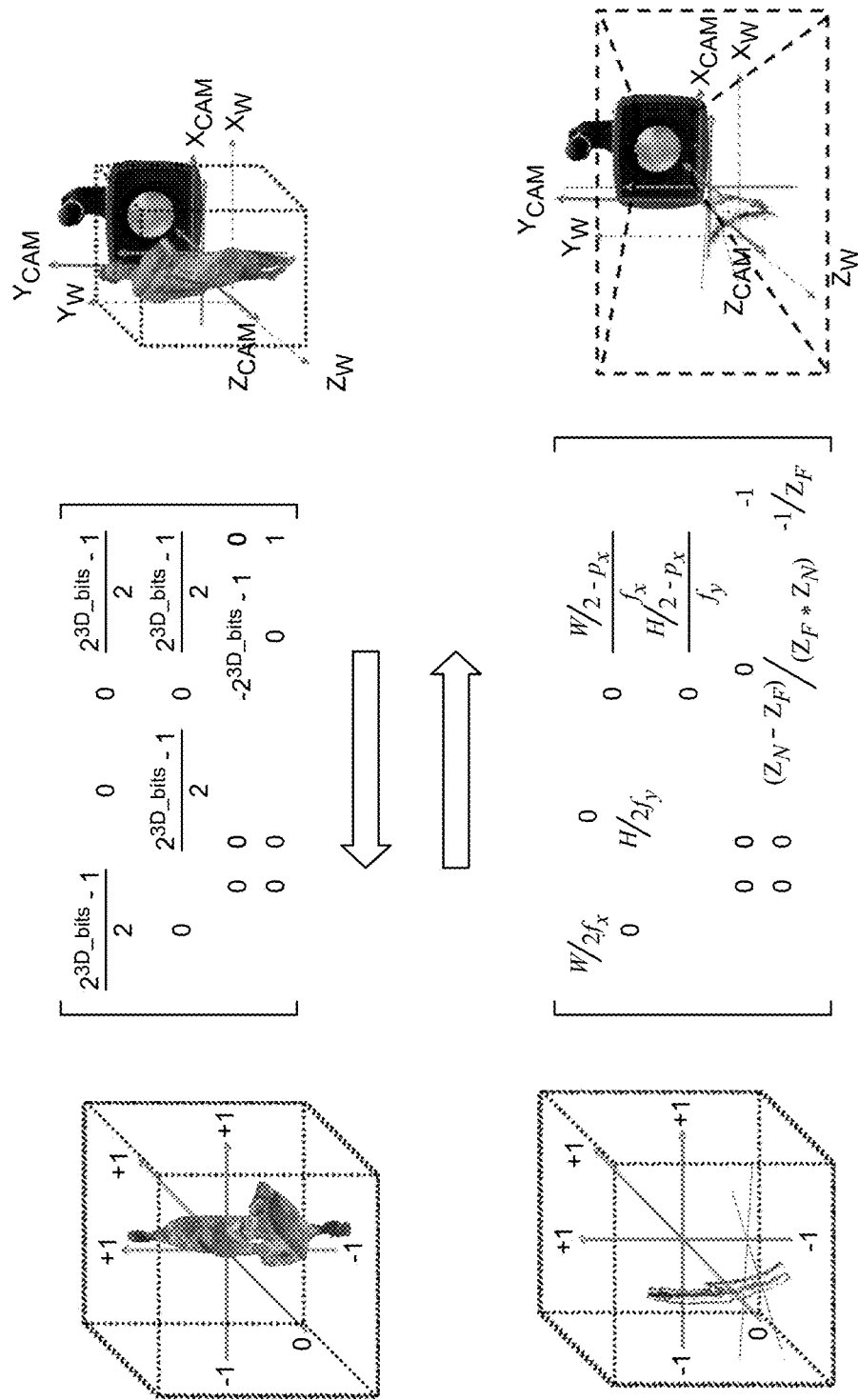
FIG. 7 illustrates a diagram of NDC system to camera conversion according to some embodiments.

FIG. 7 illustrates a diagram of NDC system to camera conversion according to some embodiments. The top matrix is used for conversion of V-PCC, and the bottom matrices are for the MIV conversion.

Figure 8:
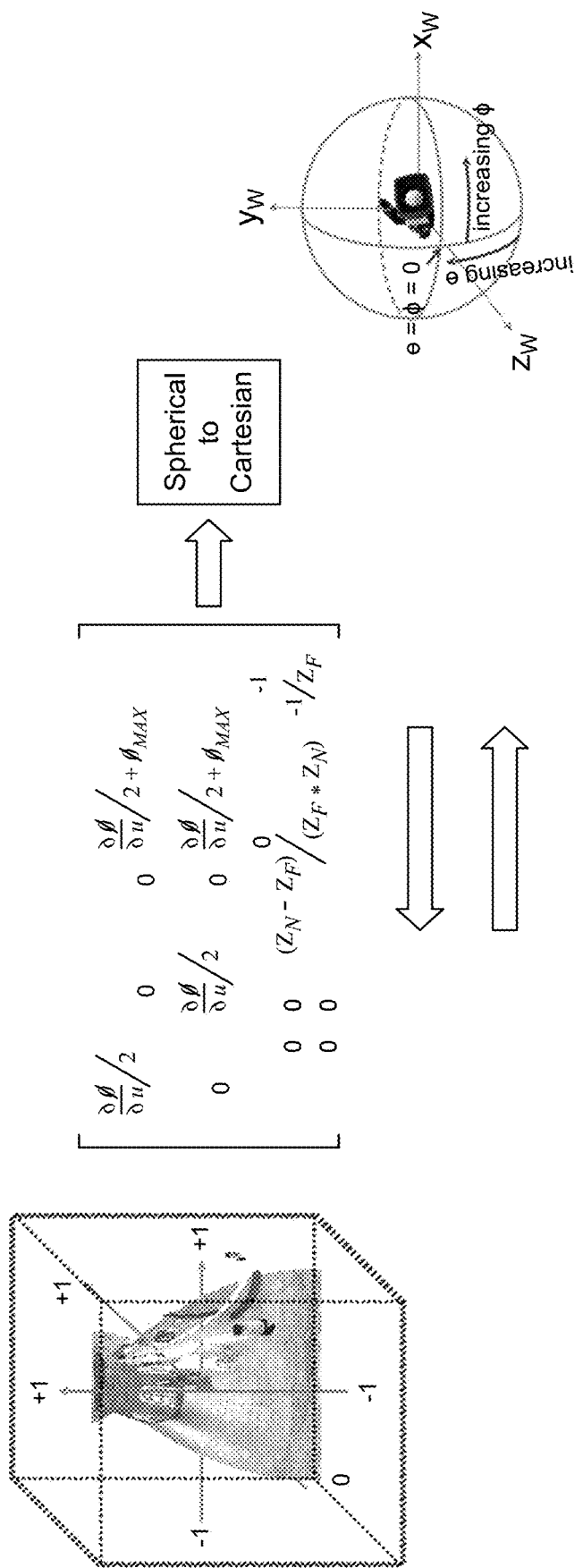
FIG. 8 illustrates a diagram of NDC system to camera conversion with an omin-directional camera according to some embodiments.

FIG. 8 illustrates a diagram of NDC system to camera conversion with an omin-directional camera according to some embodiments. In some embodiments, the spherical coordinates are converted to Cartesian coordinates.

Figure 9:
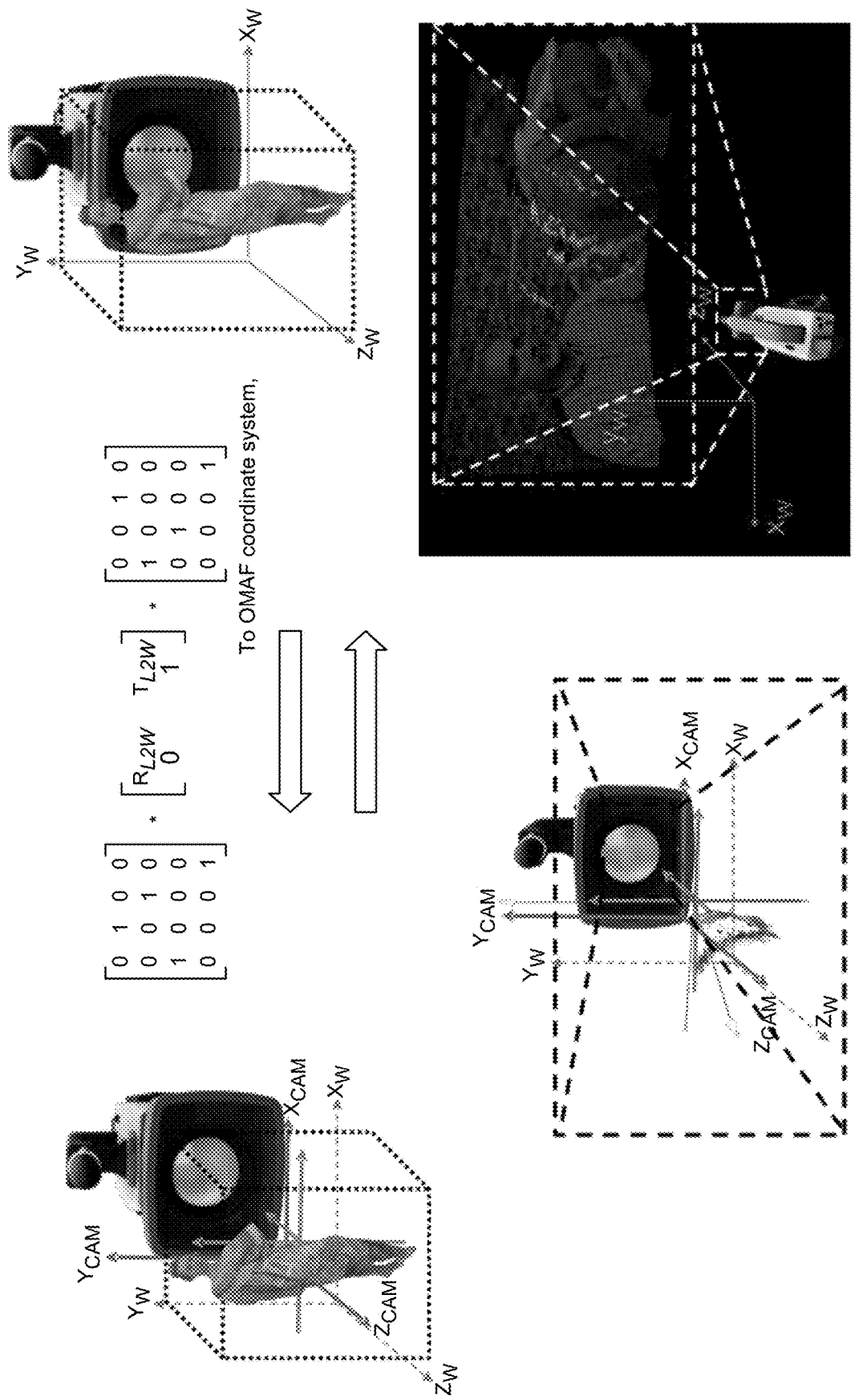
FIG. 9 illustrates a diagram of camera to world conversion according to some embodiments.

FIG. 9 illustrates a diagram of camera to world conversion according to some embodiments. Again, the top matrix is used for conversion of V-PCC, and the bottom matrices are for the MIV conversion. Additionally, dynamic cameras are able to be modeled by sending new explicit parameters such as position, yaw, pitch, roll and scaling.

An example of V-PCC cameras using explicit camera notation includes:

| | Value |
|---|---|
| camera_params_list( ) { | |
|   cpl_explicit_projection_info_enabled_flag | 1 |
|   if (cpl_explicit_projection_info_enabled_flag) { | |
|     cpl_num_cameras_minus1 | 6 |
|     cpl_cam_pos_x_granularity | 1 |
|     cpl_cam_pos_y_granularity | 1 |
|     cpl_cam_pos_z_granularity | 1 |
|     cpl_yaw_pitch_roll_present_flag | 1 |
|     cpl_cam_id_present_flag | 0 |
|     for (i=0; i<=cpl_num_cameras_minus1; i++) { | |
|     if (cam_id_present flag) | |
|       cpl_cam_view_id[i] | -- |
|     else | |
|       cpl_cam_view_id[i] = i | |
|     cpl_cam_pos_x[i] | 0,0,0,0,0,0 |
|     cpl_cam_pos_y[i] | 0,0,0,0,0,0 |
|     cpl_cam_pos_z[i] | 0,0,0,0,0,0 |
|     if (cpl_yaw_pitch_roll_present_flag) { | |
|       cpl_cam_yaw[i] | 0,270,0,0,270,0 |
|       cpl_cam_pitch[i] | 90,270,0,90,270,0 |
|       cpl_cam_roll[i] | 0,0,0,0,0,0 |

-continued

| | Value |
|---|---|
| cpl_cam_rotation_scaling_flag[i] | 1,0,0,1,0,0 |
| if (cpl_cam_rotation_scaling_flag) { | |
|     cpl_cam_rot_scale_x[i] | 1,1 |
|     cpl_cam_rot_scale_y[i] | 1,1 |
|     cpl_cam_rot_scale_z[i] | -1,-1 |
|     } | |
|   } | |
| } | |
| cpl_intrinsic_params_equal_flag | 0 |
| camera_intrinsics(cpl_intrinsic_params_equal, cpl_num_cameras_minus_1) | |
| cpl_depth_quantization_params_equal_flag | 1 |
| depth_quantization(cpl_depth_quantization_equal_flag, cpl_num_cameras_minus_1) | |
| } | |

| | Value |
|---|---|
| camera_intrinsics(equalFlag, numCamerasMinus1) { | |
|   for (v=0; v<=; v++) { | |
|     if (v == 0 \|\| equalFlag == 0) { | |
|       cam_type[v] | 2 |
|       projection_plane_width[v] | 2^(gi_geometry_3d_coordinates_bitdepth_minus1+1)-1 |
|       projection_plane_height[v] | 2^(gi_geometry_3d_coordinates_bitdepth_minus1+1)-1 |
|       cpl_cam_reverse_depth_flag[i] | 0,0,0,0,0,0 |
|       cpl_cam_projection_mode_flag[i] | 0,0,0,1,1,1 |
|       if (cam type[v] ==0) { | |
|         erp_phi_min[v] | |
|         erp_phi_max[v] | |
|         erp_theta_min[v] | |
|         erp_theta_max[v] | |
|       } else if (cam_type[v] == 1) | |
|         cubic_map_type [v] | |
|       else if (cam_type[v] == 2) { | |
|         perspective_focal_hor[v] | 1 |
|         perspective_focal_ver[v] | 1 |
|         perspective_center_hor[v] | 0 |
|         perspective_center_ver[v] | 0 |
|       } | |

| | Value |
|---|---|
| depth quantization(equalFlag, numCameraMinus1) { | |
|   for (v=0; v<=; v++) { | |
|     if (v==0 \|\| equalFlag == 0) { | |
|       quantization_law[v] | 0 |
|       if (quantization_law[v == 0) { | |
|         depth near[v] | 0 |
|         depth far[v] | 2 (gi_geometry_3d_coordinates_bitdepth_minus1+1)-1 |
|       } | |
|     } else { | |
|       quantization_law[v] = quantization_law[0] | |
|       depth_near[v] = depth_near[0] | |
|       depth_far[v] = depth_far[v] | |
|     } | |
|   } | |
| } | |

Figure 10:
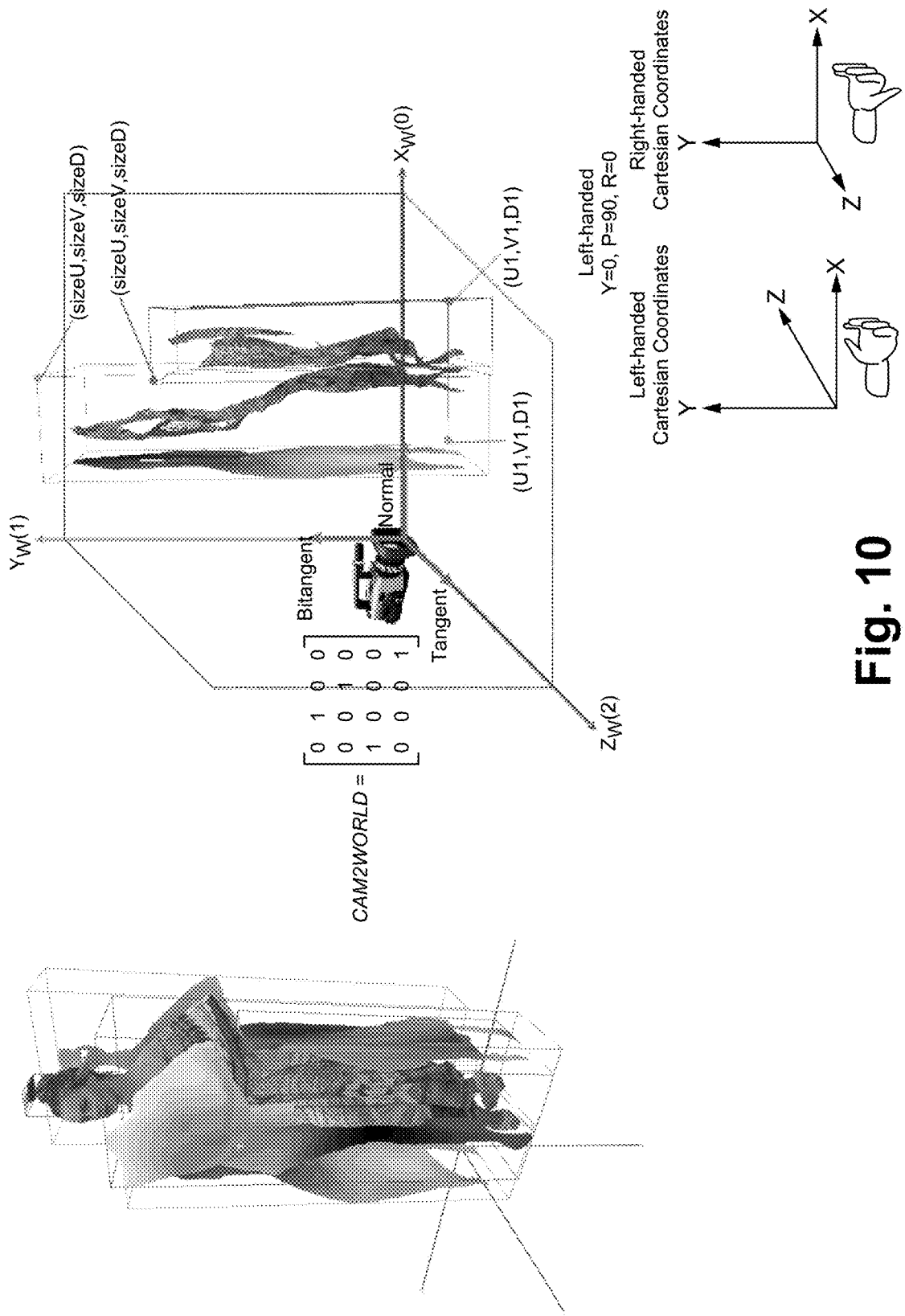
FIGS. 10-12 illustrate diagrams of the V-PCC camera model according to some embodiments.
Figure 11:
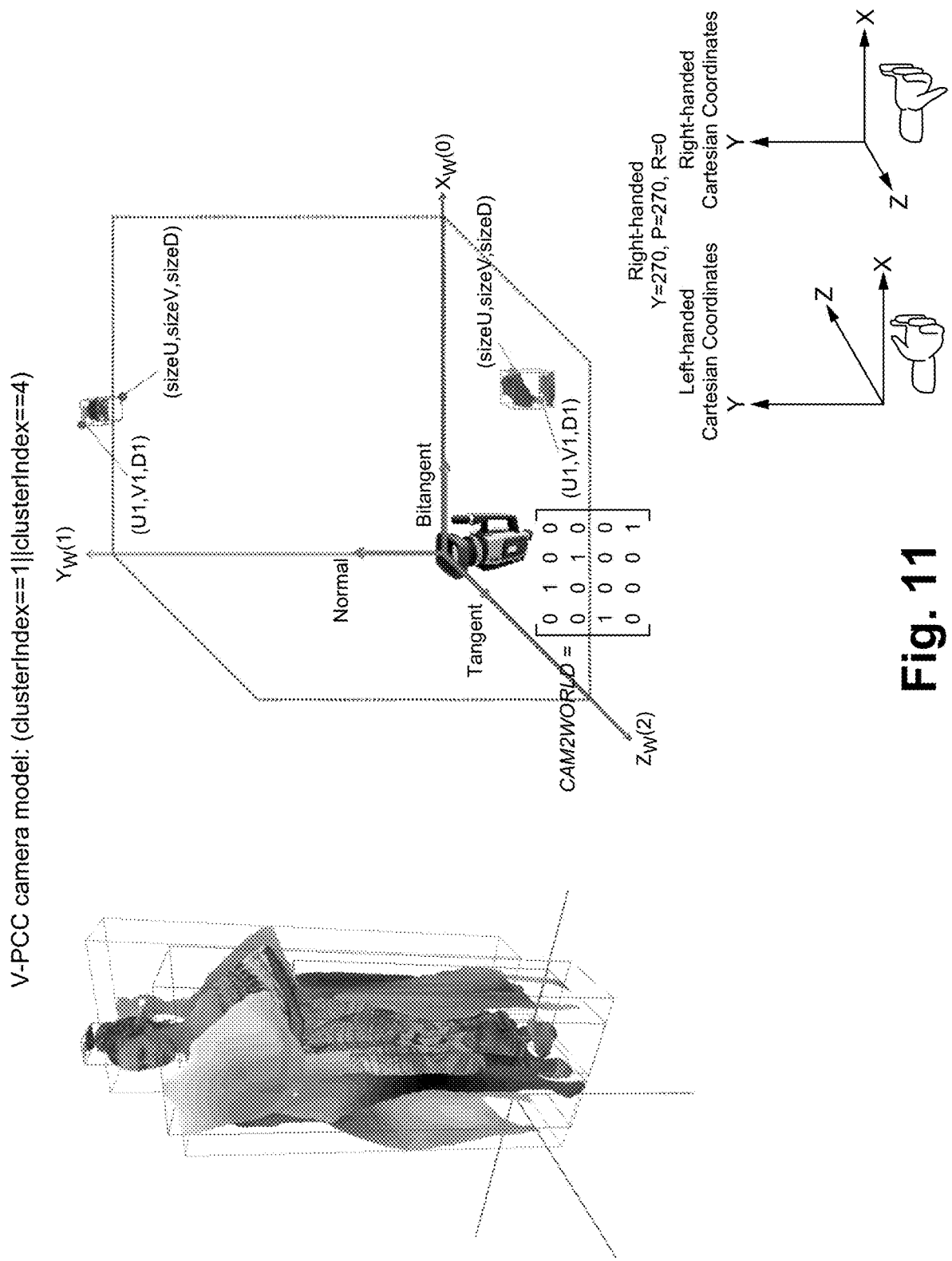
Figure 12:
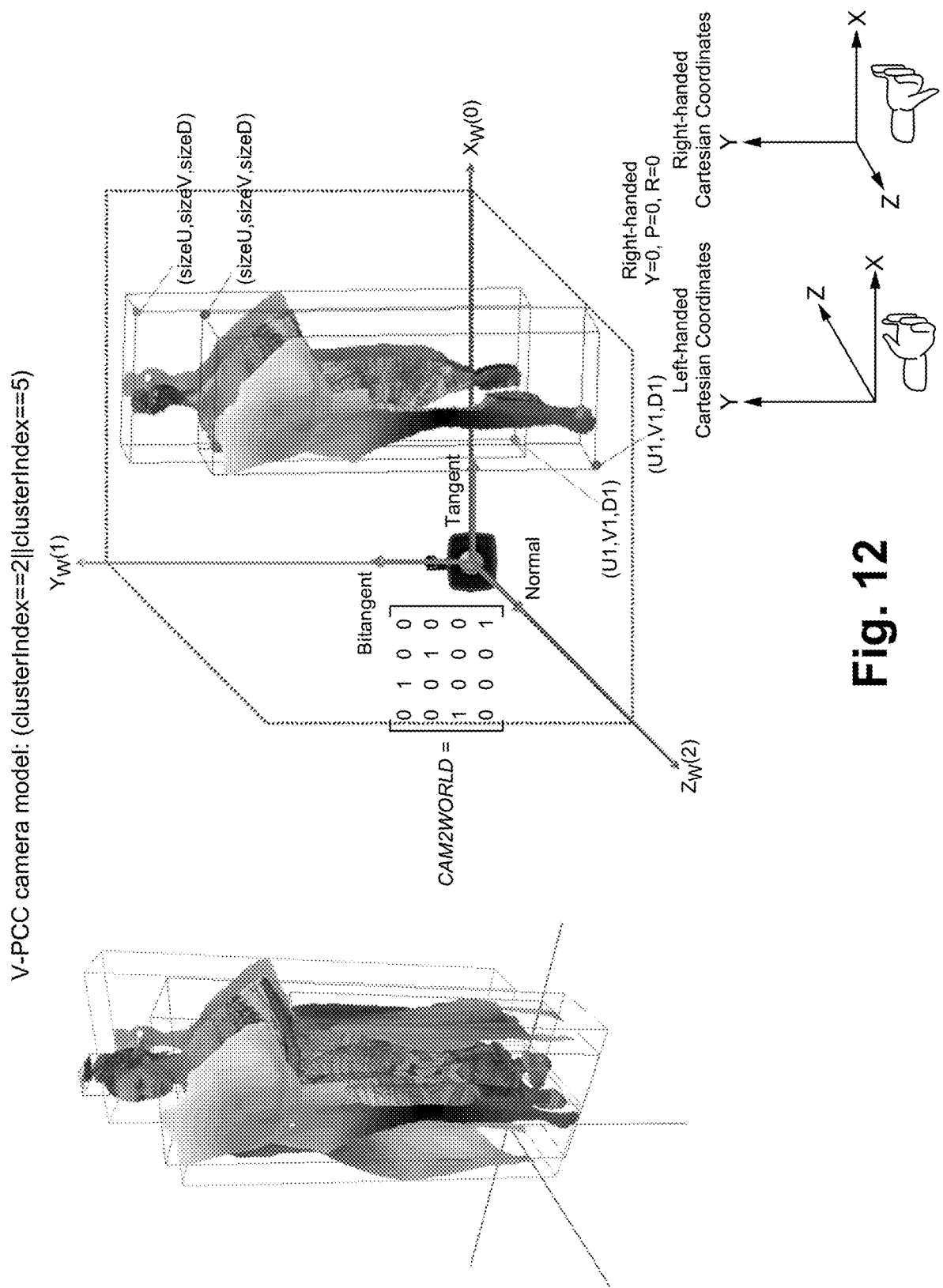

FIGS. 10-12 illustrate diagrams of the V-PCC camera model according to some embodiments. In FIG. 10, clusterIndex==0||clusterIndex==3. In FIG. 11, clusterIndex==1||clusterIndex==4. In FIG. 12, clusterIndex==2||clusterIndex==5. The "clusterIndex" is the syntax element that indicates the direction of projection. There are six directions: +x or –x, +y or –y, +z or –z, which are identified by the numbers 0-3, 1-4, and 2-5.

Figure 13:
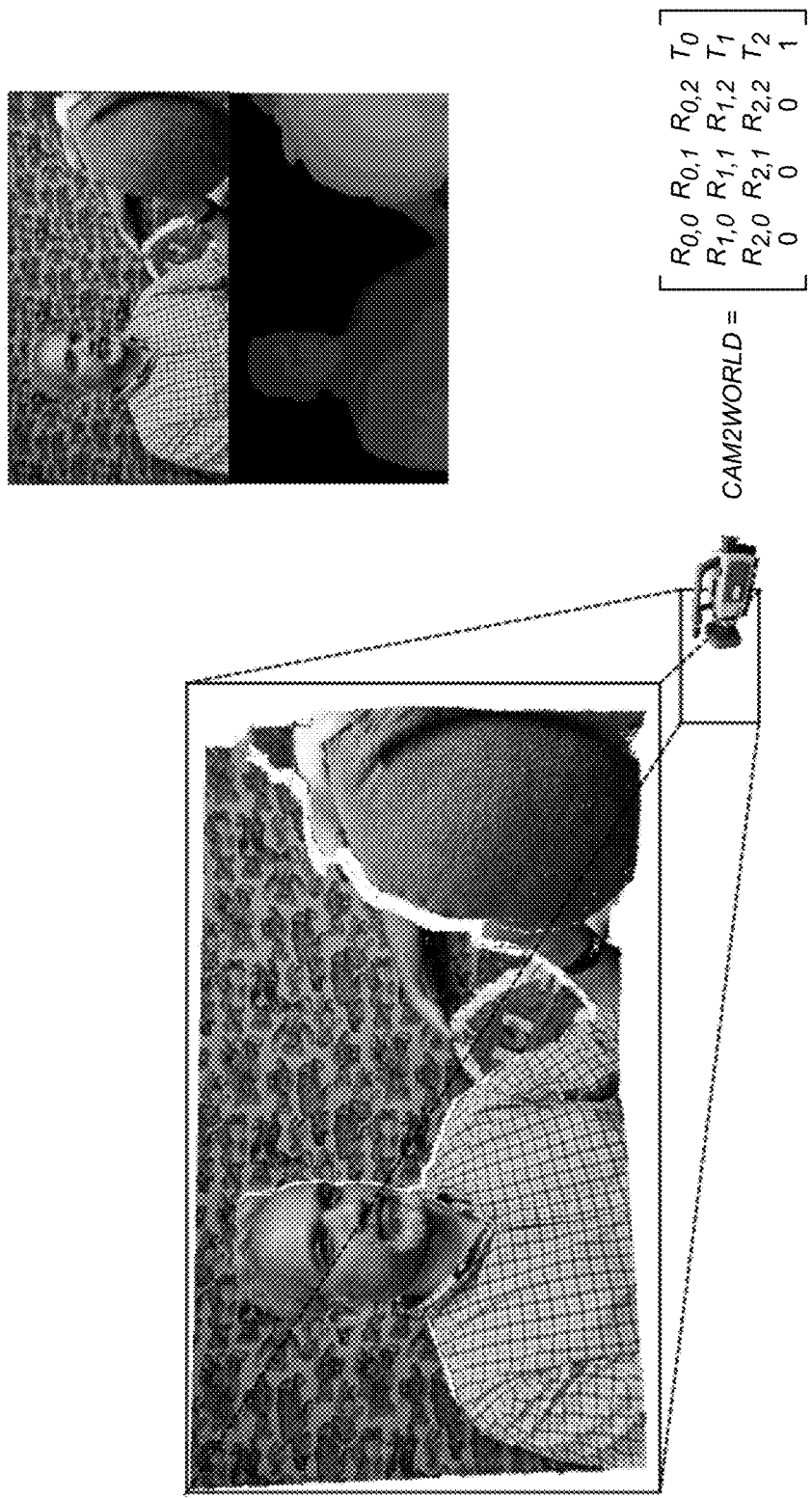
FIG. 13 illustrates a diagram of a MIV camera model according to some embodiments.

FIG. 13 illustrates a diagram of a MIV camera model according to some embodiments. The MIV camera model syntax elements include: camera extrinsic parameters (e.g., position, yaw, pitch, roll), camera intrinsic parameters (focal distance, window size, principal point location) and near/far planes.

Figure 14:
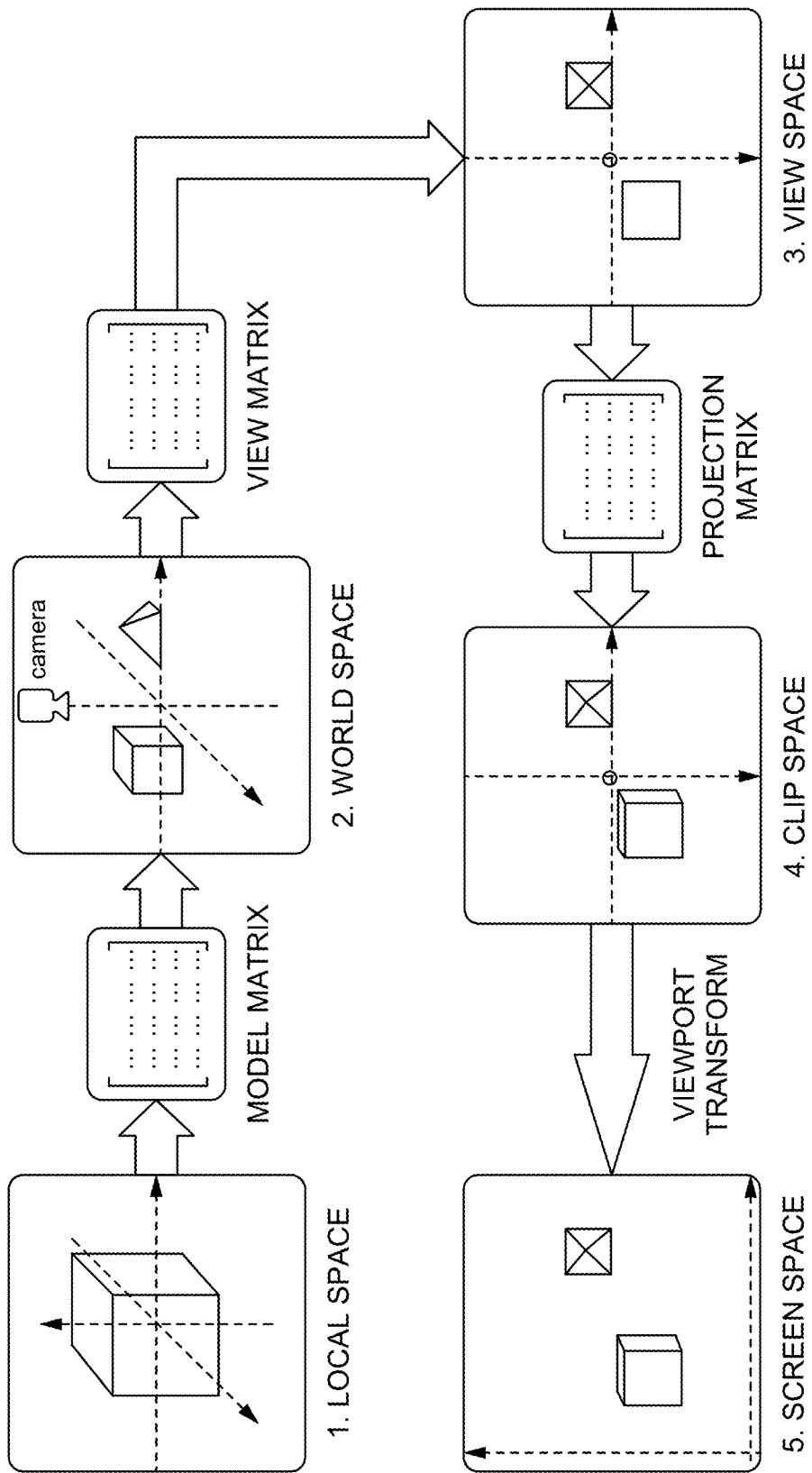
FIG. 14 illustrates a diagram of the conversions according to some embodiments.

FIG. 14 illustrates a diagram of the conversions according to some embodiments. As described herein, data in various spaces is converted using matrices such as a model matrix, a view matrix, a projection matrix, and a viewport transform.

Figure 15:
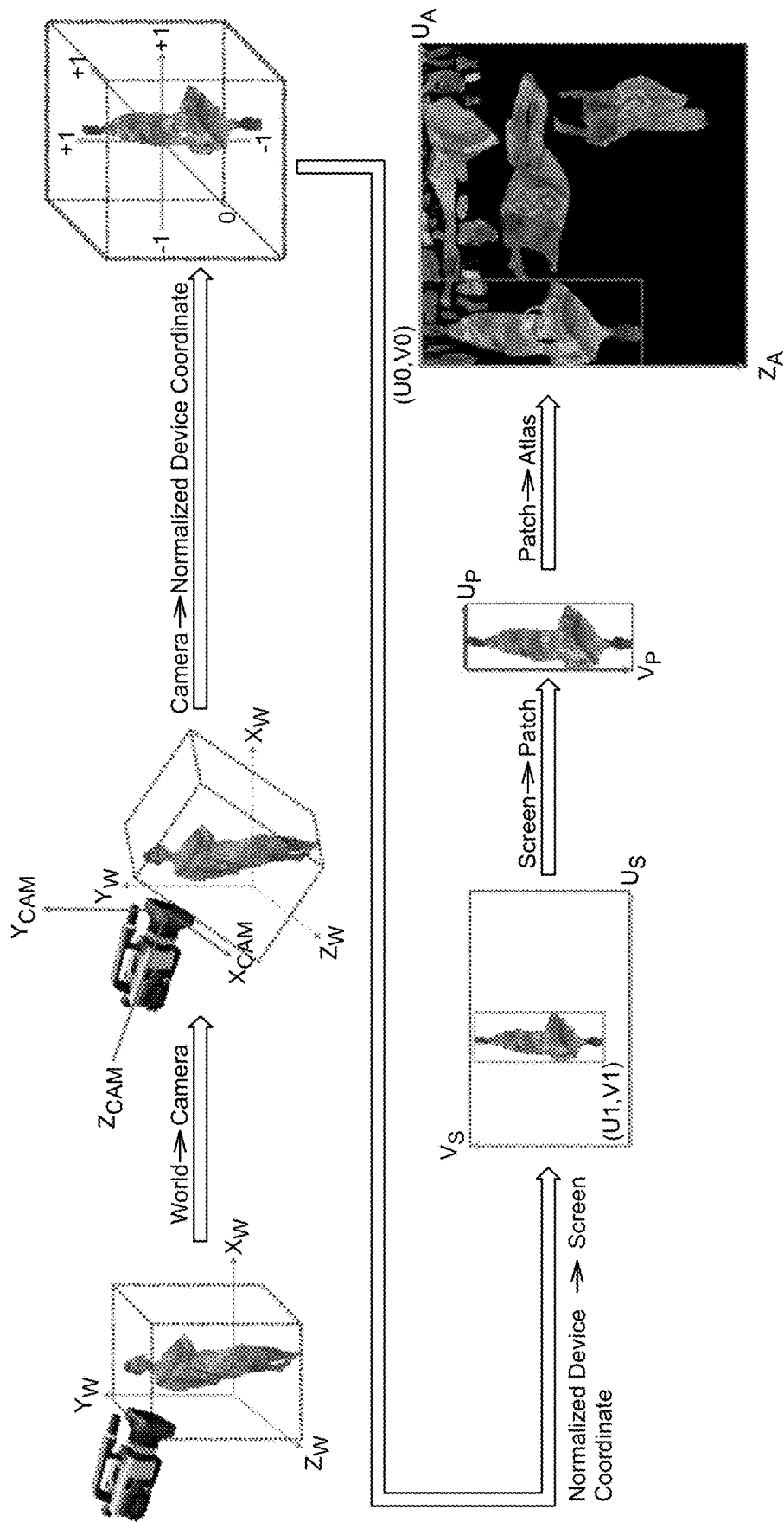
FIG. 15 illustrates a camera model for joint PCC atlas creation according to some embodiments.

FIG. 15 illustrates a camera model for joint PCC atlas creation according to some embodiments.

Figure 16:
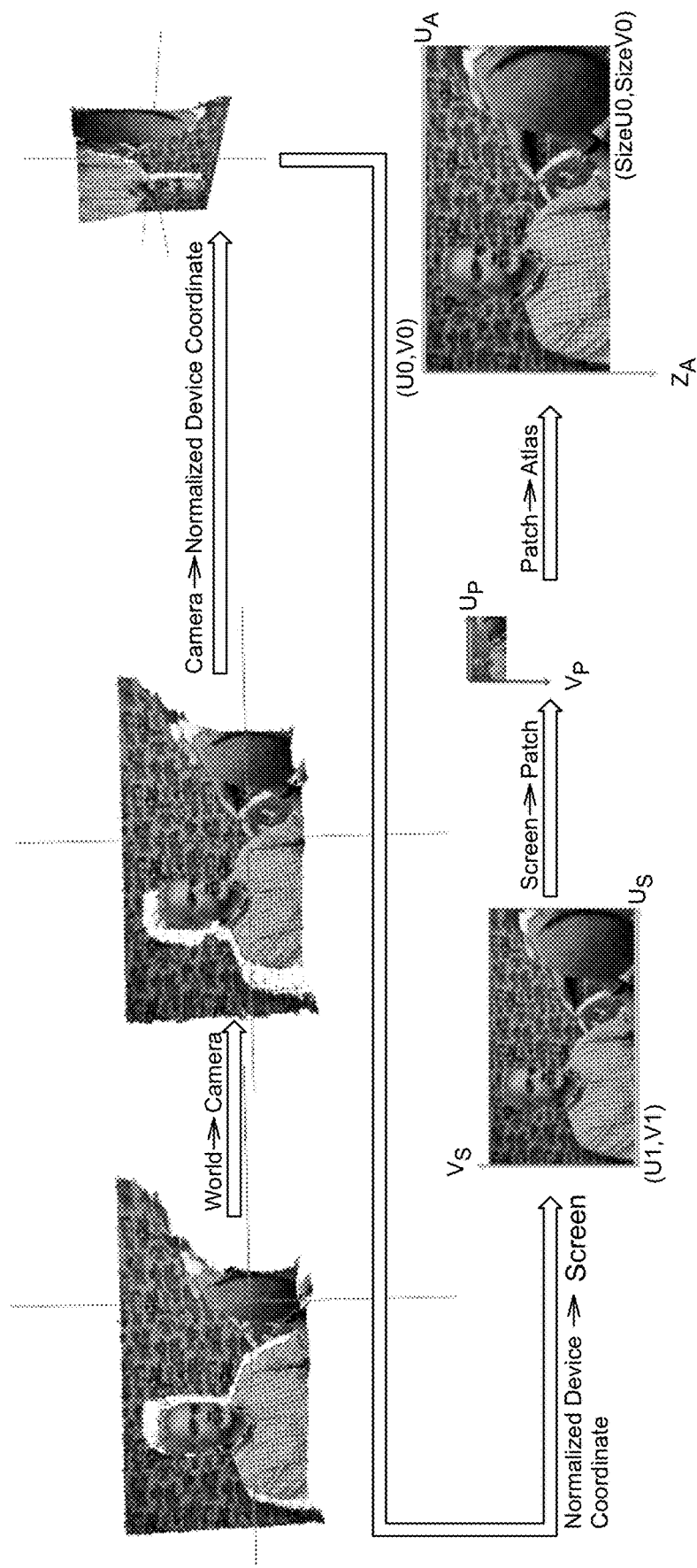
FIG. 16 illustrates a camera model for joint MIV atlas creation according to some embodiments.

FIG. 16 illustrates a camera model for joint MIV atlas creation according to some embodiments.

As described herein, the unified coding method includes indicating if an occupancy map is embedded in geometry streams or not. Additionally, the unified coding method includes indicating if the range of the depth image was compressed or not (otherwise, depth slicing is assumed).

Figure 17:
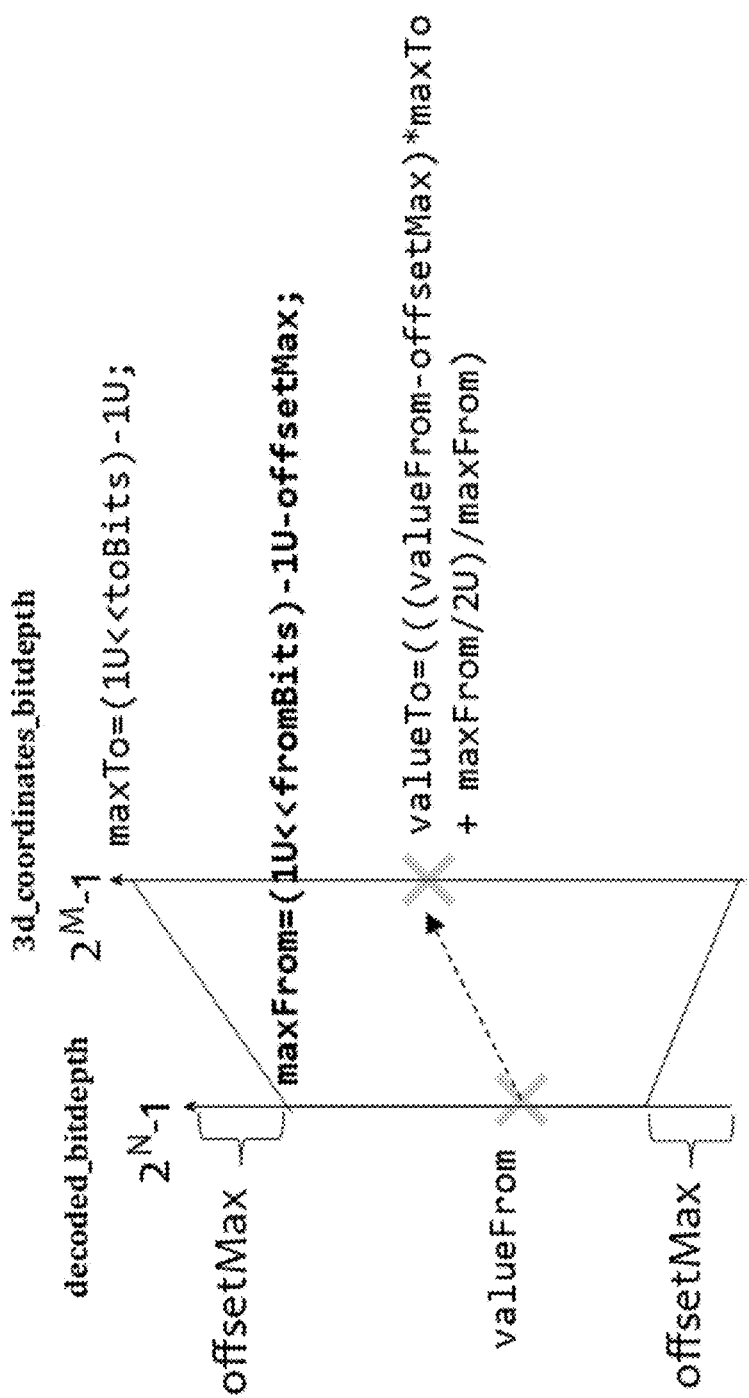
FIG. 17 illustrates a diagram of the offset and bitdepth according to some embodiments.

FIG. 17 illustrates a diagram of the offset and bitdepth according to some embodiments. In PCC, depth is represented from 3D->2D by range slicing. Nominal 2D bit depth is less than decoded bit depth. In MIV, depth is represented from 3D->2D by range compression. Decoded bit depth is less than nominal bit depth. Offset is used to reserve values to embed occupancy maps in geometry.

In some embodiments, patch generation is able to be modified. For example, in some embodiments, MIV patch fixates the patch position, and generates the same patches for all frames. In some embodiments, the procedure is modified to generate patches per frame. In some embodiments, MIV does not use an occupancy map; rather, it is sent embedded in geometry. In some embodiments, the occupancy map is able to be sent to improve geometry reconstruction.

In some embodiments, depth is consistent across views, along with attribute values. In some embodiments, depth is attached to surfaces to avoid isolated points. In some embodiments, pixels with mixed foreground and background texture are sent as an enhancement layer and removed for coding.

Figure 18:
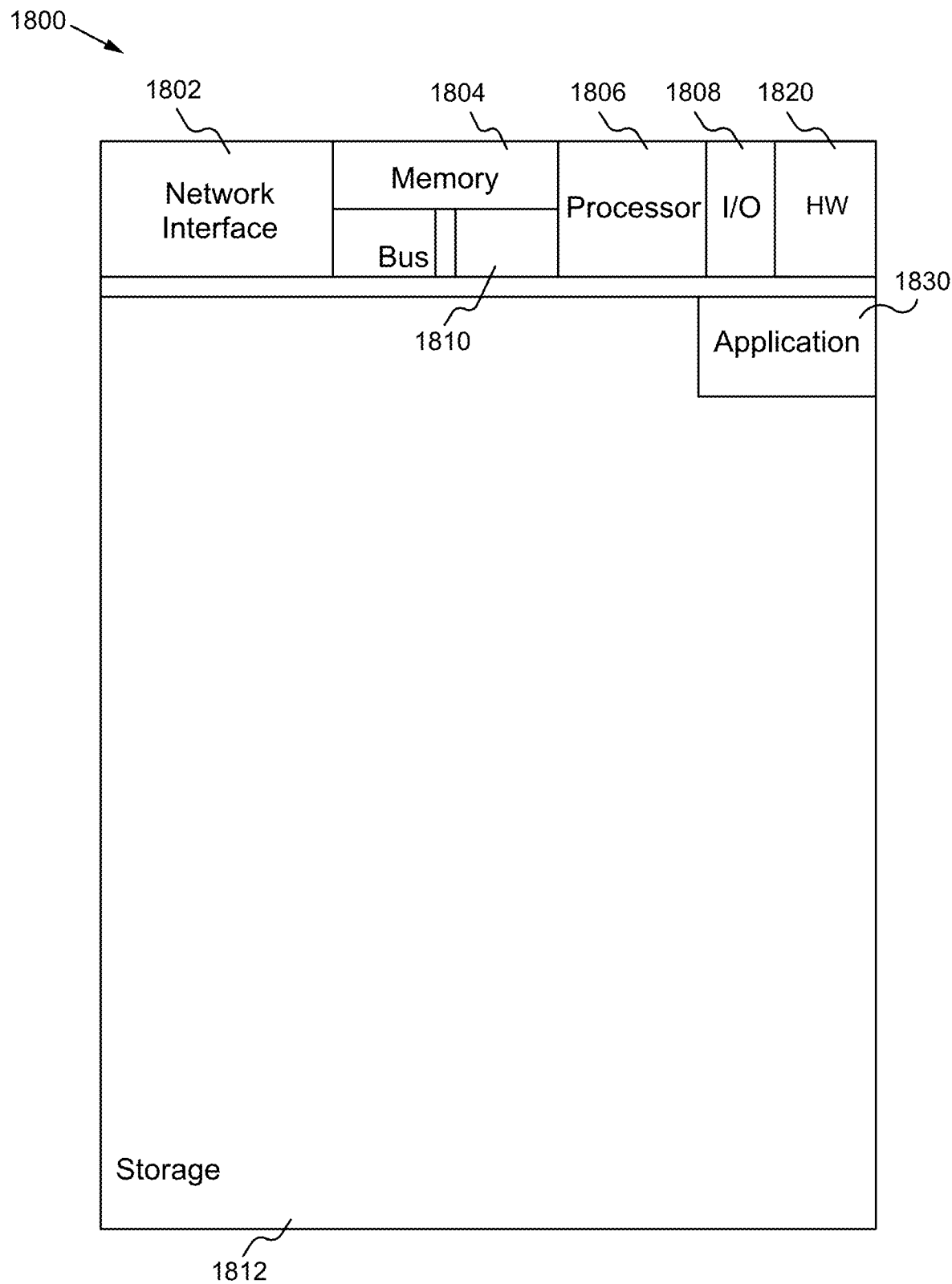
FIG. 18 illustrates a block diagram of an exemplary computing device configured to implement the unified coding method according to some embodiments.

FIG. 18 illustrates a block diagram of an exemplary computing device configured to implement the unified coding method according to some embodiments. The computing device 1800 is able to be used to acquire, store, compute, process, communicate and/or display information such as images and videos including 3D content. The computing device 1800 is able to implement any of the unified coding aspects. In general, a hardware structure suitable for implementing the computing device 1800 includes a network interface 1802, a memory 1804, a processor 1806, I/O device(s) 1808, a bus 1810 and a storage device 1812. The choice of processor is not critical as long as a suitable processor with sufficient speed is chosen. The memory 1804 is able to be any conventional computer memory known in the art. The storage device 1812 is able to include a hard drive, CDROM, CDRW, DVD, DVDRW, High Definition disc/drive, ultra-HD drive, flash memory card or any other storage device. The computing device 1800 is able to include one or more network interfaces 1802. An example of a network interface includes a network card connected to an Ethernet or other type of LAN. The I/O device(s) 1808 are able to include one or more of the following: keyboard, mouse, monitor, screen, printer, modem, touchscreen, button interface and other devices. Unified coding application(s) 1830 used to implement the unified coding method are likely to be stored in the storage device 1812 and memory 1804 and processed as applications are typically processed. More or fewer components shown in FIG. 18 are able to be included in the computing device 1800. In some embodiments, unified coding hardware 1820 is included. Although the computing device 1800 in FIG. 18 includes applications 1830 and hardware 1820 for the unified coding method, the unified coding method is able to be implemented on a computing device in hardware, firmware, software or any combination thereof. For example, in some embodiments, the unified coding applications 1830 are programmed in a memory and executed using a processor. In another example, in some embodiments, the unified coding hardware 1820 is programmed hardware logic including gates specifically designed to implement the unified coding method.

In some embodiments, the unified coding application(s) 1830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the unified coding method, a device acquires or receives 3D content and processes and/or sends the content in an optimized manner to enable proper, efficient display of the 3D content. The unified coding method is able to be implemented with user assistance or automatically without user involvement.

In operation, the unified coding method enables unification of two implementations for 3D coding: V-PCC and MIV. Projections of the scene/object of interest are used to map the 3D information into 2D, and then subsequently use video encoders. A general camera concept is able to represent both models via signaling to allow coding of both 3D objects and 3D scenes. With the flexible signaling of the camera model, the encoder is able to compress several different types of content into a single bitstream.

In 3D point cloud coding using video encoders (e.g., V-PCC), projection from 3D to 2D is important to generate the videos that will represent the point cloud. The most efficient way of generating those videos is using 3D patches, which segments the surface of the object and uses orthogonal projection to generate segmented depth, occupancy map and texture images. The images of the 3D patches are bundled together in a 2D atlas and used as input of video encoders. This is equivalent to having virtual cameras pointing inward and capturing a single object, that is, an object-centric capture approach, and composing a mosaic of different camera views and coding the mosaic image. However, the procedure is optimized for 3D object representation, and elements of a surrounding scene (like a 360 degree view of the environment) are usually not coded with this method.

In 3D scene coding using texture and corresponding depth maps (e.g., MIV), a scene is captured by several cameras, usually situated at a particular position and facing outward. The scene-centric capture approach uses the view of real cameras with their corresponding depth maps to represent the 3D scene. Some camera views are coded as is, while other camera views encode only parts of the scene, depending on the overlap with other previously coded cameras. The partial views are considered patches, which are arranged together in one or more atlas images. Some full reference views along with other atlas views are then coded by video encoders. Even though large scenes can be efficiently encoded with this method, navigation is usually limited to the camera positions, and depth representation is non-uniform (objects closer to cameras have more precision), which may affect encoding of 3D objects.

In both cases, projections of the scene/object of interest are used to map the 3D information into 2D, and then subsequently use video encoders. Nevertheless, camera models and depth representation can be slightly different for each method. A general camera concept is able to represent both models with the appropriate signaling to allow coding of both 3D objects and 3D scenes. With the proposed flexible signaling of camera model, the encoder is able to compress several different types of content into one single bistream.

3D coding using 2D projections are able to be divided into two categories depending on the chosen camera arrangement/model. Inward-facing cameras usually focus on capture of 3D objects, while outward-facing capture 3D scenes. According to each category, object-centric or scene-centric capture, different camera models can be used. V-PCC is an example of object-centric coding, where the camera models are orthographic cameras only. For the scene-centric coding case, MIV uses different camera types, such as perspective, omnidirectional or Cube Map camera arrangements. Each coding method (V-PCC and MIV) proposes a way to signal their typical camera model in a certain way, but the syntax elements used by each separate codec cannot represent the camera model of the other one, meaning V-PCC cameras cannot be represented using MIV signaling and vice-versa. Some Embodiments of Unified Coding of 3D Objects and Scenes 1. A method programmed in a non-transitory memory of a device comprising:
    determining whether content comprises video point cloud type or multi-view type;
    encoding the content determined to be the video point cloud type into a bitstream using video point cloud coding; and
    encoding the content determined to be the multi-view type into the bitstream using multi-view coding.
2. The method of clause 1 further comprising indicating if an occupancy map is embedded in a geometry stream.
3. The method of clause 1 further comprising indicating if a range of a depth image was compressed.
4. The method of clause 1 further comprising converting an atlas of the content to a display.
5. The method of clause 4 wherein converting the atlas of the content to the display utilizes a plurality of matrices.
6. The method of clause 5 wherein the plurality of matrices include: an atlas to patch matrix, a patch to screen matrix, a screen to normalized device coordinate matrix, a normalized device coordinate to camera matrix and a camera to world matrix.

What is claimed is:

1. A method programmed in a non-transitory memory of a device comprising:
   determining whether content comprises video point cloud type or multi-view type;
   indicating if a range of a depth image was compressed;
   encoding the content determined to be the video point cloud type into a bitstream using video point cloud coding;
   encoding the content determined to be the multi-view type into the bitstream using multi-view coding; and
   indicating if an occupancy map is embedded in a geometry stream, wherein when the occupancy map is embedded in the geometry stream, a threshold value is used to determine when a position is occupied.

2. The method of claim 1 further comprising converting an atlas of the content to a display.

3. The method of claim 2 wherein converting the atlas of the content to the display utilizes a plurality of matrices.

4. The method of claim 3 wherein the plurality of matrices include: an atlas to patch matrix, a patch to screen matrix, a screen to normalized device coordinate matrix, a normalized device coordinate to camera matrix and a camera to world matrix.

5. The method of claim 2 wherein converting the atlas of the content to a display includes selecting a patch from the atlas.

6. An apparatus comprising:
   a non-transitory memory for storing an application, the application for:
      determining whether content comprises video point cloud type or multi-view type;
      indicating if a range of a depth image was compressed;
      encoding the content determined to be the video point cloud type into a bitstream using video point cloud coding;
      encoding the content determined to be the multi-view type into the bitstream using multi-view coding; and
      indicating if an occupancy map is embedded in a geometry stream, wherein when the occupancy map is embedded in the geometry stream, a threshold value is used to determine when a position is occupied; and
   a processor coupled to the memory, the processor configured for processing the application.

7. The apparatus of claim 6 wherein the application is further configured for converting an atlas of the content to a display.

8. The apparatus of claim 7 wherein converting the atlas of the content to the display utilizes a plurality of matrices.

9. The apparatus of claim 8 wherein the plurality of matrices include: an atlas to patch matrix, a patch to screen matrix, a screen to normalized device coordinate matrix, a normalized device coordinate to camera matrix and a camera to world matrix.

10. The apparatus of claim 7 wherein converting the atlas of the content to a display includes selecting a patch from the atlas.

11. A system comprising:
one or more cameras for acquiring three dimensional content; and
an encoder for encoding the three dimensional content by:
  determining whether content comprises video point cloud type or multi-view type;
  indicating if a range of a depth image was compressed;
  encoding the content determined to be the video point cloud type into a bitstream using video point cloud coding, wherein the content determined to be the video point cloud type is acquired using inward-facing cameras focused on capturing three dimensional objects;
  encoding the content determined to be the multi-view type into the bitstream using multi-view coding, wherein the content determined to be the multi-view type is acquired using outward-facing cameras focused on capturing three dimensional scenes; and
  indicating if an occupancy map is embedded in a geometry stream, wherein when the occupancy map is embedded in the geometry stream, a threshold value is used to determine when a position is occupied.

12. The system of claim 11 wherein the encoder is further configured for converting an atlas of the content to a display.

13. The system of claim 12 wherein converting the atlas of the content to the display utilizes a plurality of matrices.

14. The system of claim 13 wherein the plurality of matrices include: an atlas to patch matrix, a patch to screen matrix, a screen to normalized device coordinate matrix, a normalized device coordinate to camera matrix and a camera to world matrix.

15. The system of claim 12 wherein converting the atlas of the content to a display includes selecting a patch from the atlas.

* * * * *